Figure 1:
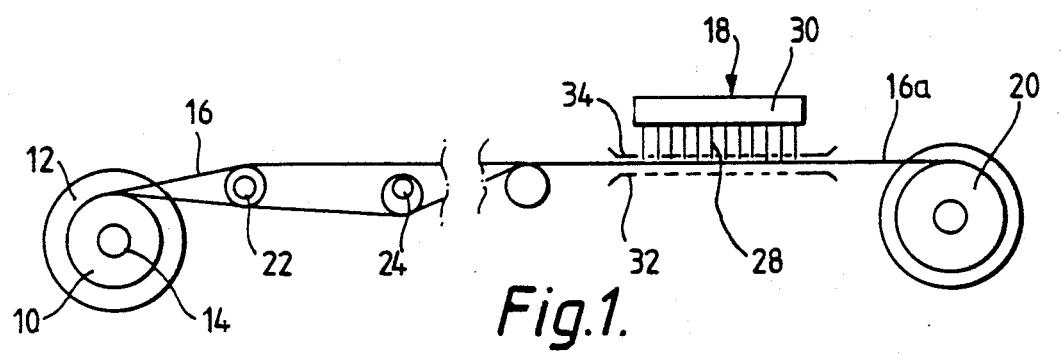

United States Patent [19]

Lawton et al.

[11] Patent Number: 5,113,568
[45] Date of Patent: May 19, 1992

[54] PRODUCTION OF A SHAPED FILAMENTARY STRUCTURE

[76] Inventors: Peter G. Lawton, West Hadlow, Albert Promenade, Halifax, West Yorkshire HX2 6AD; Norman Smith, 5 Badby Leys, Rugby, Warwickshire CV22 5RB, both of England

[21] Appl. No.: 573,552

[22] Filed: Aug. 24, 1990

Related U.S. Application Data

[62] Division of Ser. No. 6,899, Jan. 27, 1987, Pat. No. 4,955,123.

Foreign Application Priority Data

Jan. 28, 1986 [GB] United Kingdom ............... 8602003

[51] Int. Cl.$^5$ ............................................. B22D 19/14
[52] U.S. Cl. ............................................. 29/419.1; 29/715
[58] Field of Search ............................ 28/107, 114, 115; 29/411, 412, 419.1, 521, 715

[56] References Cited

U.S. PATENT DOCUMENTS 4,097,983  7/1978  Cole ............................... 29/521
4,970,052  12/1988  Olry ............................... 28/114 X Primary Examiner—Timothy V. Eley
Attorney, Agent, or Firm—W. Thad Adams, III

[57] ABSTRACT

The invention is concerned with a method and apparatus for producing a shaped filamentary structure and more particularly, to filamentary structures which can be subjected to further processing to produce a carbon-carbon product. A specific use of the invention is in the production of discs for use in aircraft braking systems.

The method includes needle punching a unidirectional layer of filaments to give a degree of dimensional stability; cutting a plurality of segments from the layer of needle punched filamentary material; assembling a plurality of segments in side-by-side contiguous relationship to produce a filamentary layer of the required structural shape; superimposing at least one similar layer on the first layer and needle punching the assembled layers to produce cross-linking of the layers.

In the preferred method of carrying out the invention, the layers of filamentary material are supported by a sub-structure which permits needle penetration, and this sub-structure is peeled off the final needle punched assembly. A further preferred feature includes assembling the segments in a former and rotating the former relative to a reciprocating needling head.

The invention also comprises an apparatus for producing a shaped filamentary structure comprising an open-topped receptable for the assembled segments; a needling head located over only part of the receptacle means for rotating the receptacle to bring a complete annulus of the filamentary segments in it under the needling head and a support located inside the receptacle and means for rotating the support with the receptacle, and lowering the support relatively to the receptacle during the needling operation.

5 Claims, 8 Drawing Sheets

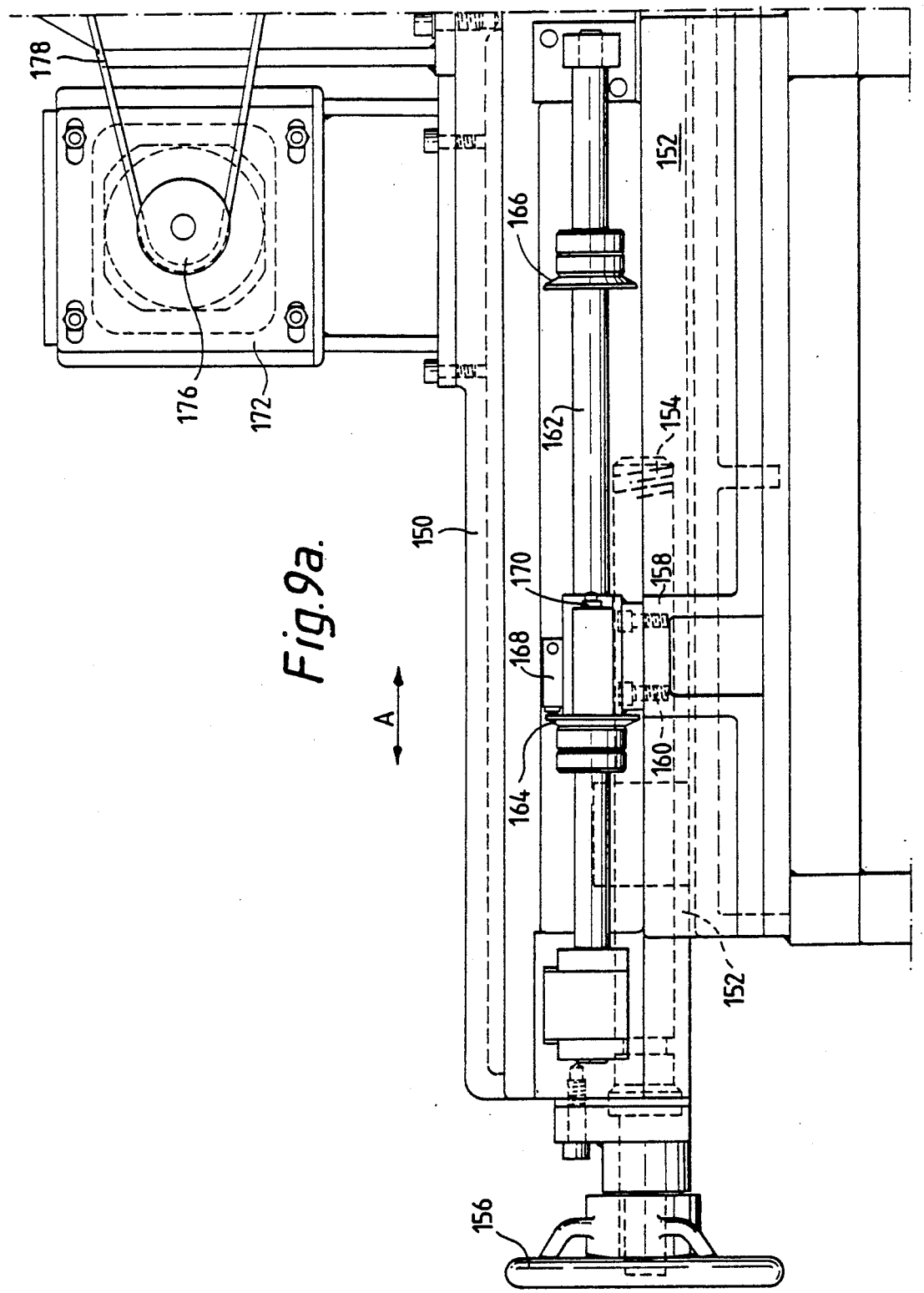

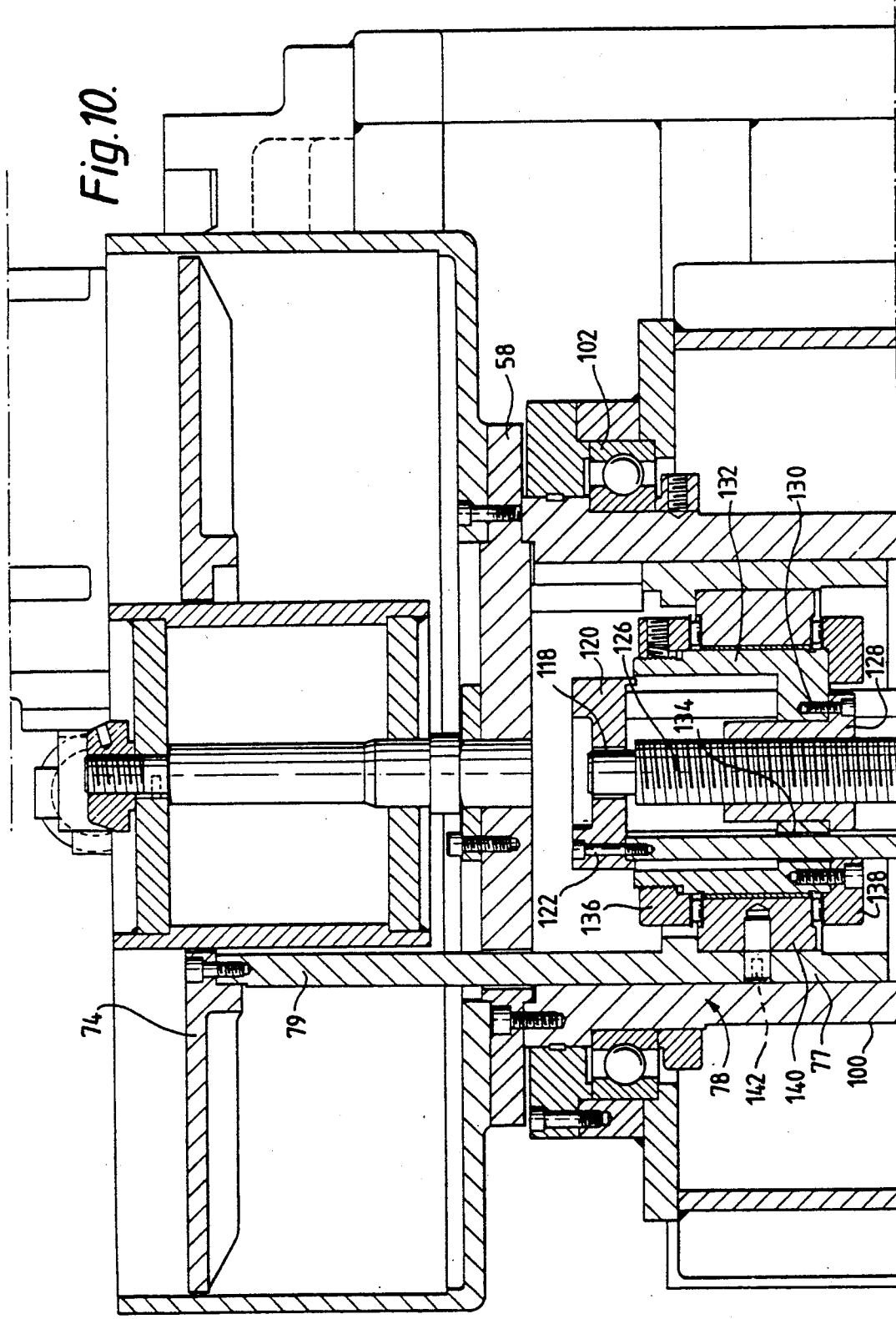

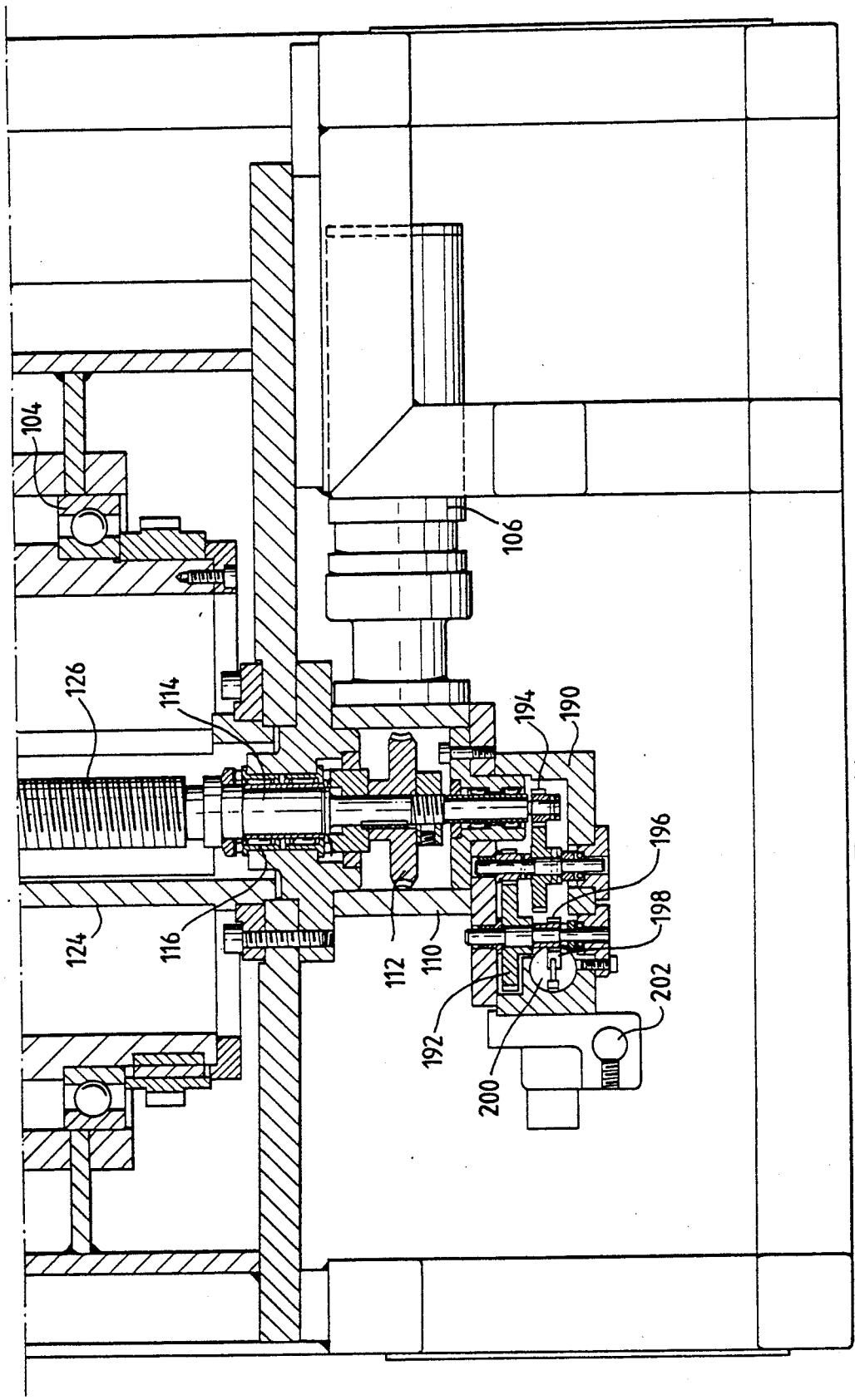

PRODUCTION OF A SHAPED FILAMENTARY STRUCTURE

This application is a divisional; of application Ser. No. 006,899, filed on Jan. 27, 1987, now U.S. Pat. No. 4,955,123.

The invention relates to a method and apparatus for the production of a shaped filamentary structure and to filamentary structures made by the method and/or made on the apparatus. A particular application of the invention is in the manufacture of a carbonisable assembly and even more particularly to the manufacture of circular or annular shaped filamentary assemblies. It is to be understood however that in its broadest aspects, the invention is not restricted to any particular type of filamentary material nor to any particular shape of product. The expression "shaped structure" is however intended to exclude the production of more piece goods.

United Kingdom Patent No. 1 447 030 discloses a method of manufacturing fibrous sheet material in which a layer of filamentary material is subject to a needle punching operation and then up to four such layers are combined with each other by a subsequent needle punching operation. In some of the layers, the filaments extend substantially longitudinally (warp wise) of the sheet, whilst in other layers, the filaments extend transversely (weft wise) of the sheet.

If it is required to produce shaped structures from the sheet material made in accordance with United Kingdom Patent Specification 1 447 030, the shape must be cut from the sheet material. In the case of circular or annular shapes for example, this is very wasteful of the material. The said United Kingdom Patent Specification describes the manufacture of carbonisable sheet material and in fact this material has been used for the manufacture of carbon fibre reinforced discs for brakes. The method of manufacture of the discs involves cutting annular shapes from the sheet material—with the attendant material wastage—assembling a set of these cut-out shapes in a stack; impregnating the stack with resin clamping it in a mould and baking the assembly in an oven to carbonise the resin and produce a carbon-carbon structure. This process has three serious disadvantages. The moulds used to clamp the assemblies are bulky and typically, two-thirds of the oven space is occupied by the moulds, rather than useful material; hence the process is wasteful of energy. Moreover, the moulds are made of graphite and have a short life so that the cost of the moulds is high. Because the layers are bonded by the baking process, there is a tendency for delamination to occur either during the manufacture of the carbon-carbon product, or later if the finished disc is subjected to applied stresses, as occur when the disc is used in say an aircraft braking system.

The objects of the present invention are to overcome the material wastage problem whatever the resultant shaped product; to overcome the energy waste problem when the resultant product is a carbon fibre reinforced product and to overcome the delamination problem during subsequent processing or when the resultant product is subjected to applied stress.

According to one aspect of the invention a method of producing a shaped filamentary structure comprises the steps of: subjecting a unidirectional layer of filaments to a needle punching action to give a degree of dimensional stability to the layer adequate to allow severing and manipulation of the layer; cutting a plurality of segments from the layers; assembling at least two of the segments in side-by-side contiguous relationship to produce a first filamentary layer of the required structural shape; superimposing at least one similarly formed filamentary layer on the first layer and needle punching the assembled layers to produce cross linking of the layers by filaments displaced out of the layers and extending in a direction generally perpendicular to the faces of the layers.

The most significant departure from the prior art method is the cutting of the segments from the dimensionally stable layer and assembling the segments side-by-side to produce the structural shape. This means that it is possible to reduce the wastage of material, because it is possible to lay out the segmental shapes to enable maximum use of the filamentary material. Such judicious laying out is practised in the garment industry and the techniques are well known.

According to a preferred method, the segments forming the first filamentary layer are laid on a substructure rigid enough to support the first layer to allow the subsequent layer(s) to be superimposed on it, but having a structure which permits needle penetration, at least the initial needle punching of the assembled layers involving penetration of the sub-structure, whereby the assembled layers become a structure, but the degree and density of the penetration being limited to ensure that the needled assembled layers can be separated from the sub-structure without damaging the shape and stability of the needled assembled layers.

The use of the needle-penetrable sub-structure represents an important feature of the invention, because it greatly facilitates the location of the segments of the first layer when they are first assembled in the side-by-side relationship, at which stage, they may not be attached to each other. It further assists in locating the first layer whilst the second and subsequent layers are laid on top of it and needle punched. Indeed, it can be said that the sub-structure provides a large measure of stability to the filamentary structure both during the production of the filamentary structure and in subsequent manipulation up to the time when the filamentary structure is peeled off the sub-structure.

According to a preferred feature of this aspect of the invention, the segments are assembled in a former which locates the segments relatively to each other during the needle punching of the assembled layers. The location of all the segments is greatly facilitated if they are laid up in a former according to the preferred feature of the invention.

According to another preferred feature of this aspect of the invention the longitundinal axes of the filaments in a superimposed layer of segments are disposed at an angle to those of a lower layer of segments. Preferably the longitudinal axis of the filaments in the segments of each layer are disposed at an angle to those in the immediately preceding layer.

The needling of the uni-directional filaments prior to cutting out the segments is preferably carried out with the filaments subjected to a tensile force in the direction of the longitudinal direction of the filaments.

According to another preferred feature of this first aspect of the invention, the segments are formed into a circular or annular shape. Such a shape is useful for example if the finished shaped filamentary structure is to provide the reinforcing of a disc for a brake as could be the case if the filaments were of a material suitable for carbonising i.e. to produce a carbon fibre structure. One of the advantages of using the method of the first aspect of the invention to manufacture carbon fibre structures for use in disc brakes is that since all the layers are cross linked by filaments, there is no need to employ a mould when the structure is placed in the oven to form the matrix. Moreover, and again this is due to the cross linking of the layers, the tendency for the disc to delaminate during the matrix forming process or under applied stress in the finished product is minimised and can be almost eliminated.

Preferably the needling of the circular or annular assembly of the segments is carried out by reciprocating a needling head equipped with the needles and causing relative rotary motion about the axis of the circle or annulus formed by the segments relative to the needling head. Whilst it would be possible to rotate the needling head round the said axis, it is preferred to locate the needling head in a stationary position and to rotate the assembly of segments under it.

According to a second aspect of the invention a method of producing a multilayer filamentary structure comprises the steps of: laying at least three filamentary layers one on top of another and needle punching the assembly of layers in a manner such that the entire assembly is cross linked by filaments displaced from the filamentary layers and extending in a direction generally perpendicular to the faces of the layers, without needling completely through the assembly of layers. Stated another way, each of the layers is cross linked by displaced filaments to at least its contiguous layer or layers, but the top and bottom layers are not cross linked to each other.

This method may be carried out by needle punching the assembly after the addition of a layer to one or more already laid layers and superimposing a relative movement between the assembly and the needles (in the same sense as the punching action) on the punching motion, so that the bottom limit of the punching action is moved upwards relatively to the assembly during the formation of the assembly. This superimposed motion can be achieved by lowering a support on which the assembly is resting during the punching operation.

It will be appreciated that the first and second aspects of the invention can be combined, and in a preferred combination, the support which is lowered during the punching operation is the needle penetrable sub-structure.

According to a third aspect of the invention apparatus for producing a shaped filamentary structure comprises an open-topped receptacle to receive segments of filamentary material in a side-by-side arrangement; a support for the filamentary segment arrangement located inside the receptacle in a manner which permits vertical motion of the support within the receptacle; a needling head including a vertically reciprocable needle carrier; the needling head being located over part only of the receptacle; means for rotating the receptacle to bring a complete annulus of any filamentary segments in the receptacle under the needling head; whereby it is possible to needle punch all the filamentary material in the said complete annulus as the receptacle is rotated and the depth of penetration of the needles into the filamentary material can be varied by lowering the support during the needling operation.

It is preferred that the apparatus includes means for moving the needling head to a retracted location where it is not vertically aligned with the receptacle. This allows the finished shaped structure to be removed from the receptacle.

In the preferred construction, the means for rotating the receptacle and for moving the support vertically comprise two separate motors each having its own gearing. Preferably one or both of the motors is or are of variable speed.

It is further preferred that the receptacle is carried by a hollow spindle rotatable about a vertical axis, there being a rotatable screw also having a vertical axis inside the hollow spindle, a nut engaging on the screw being mounted in the hollow spindle for vertical sliding motion, but restrained against rotary motion, so that rotation of the screw causes vertical axial motion of the nut; there being driving columns connected to the support, having rotary driving connection with the receptacle for rotating the support with the receptacle, and a connection with the nut, for transmitting axial motion of the nut to the columns without applying rotary motion from the columns to the nut.

Figure 3:
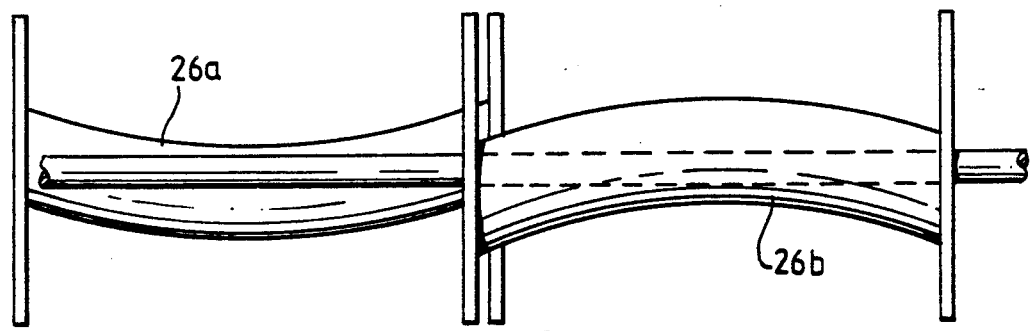
Figure 2:
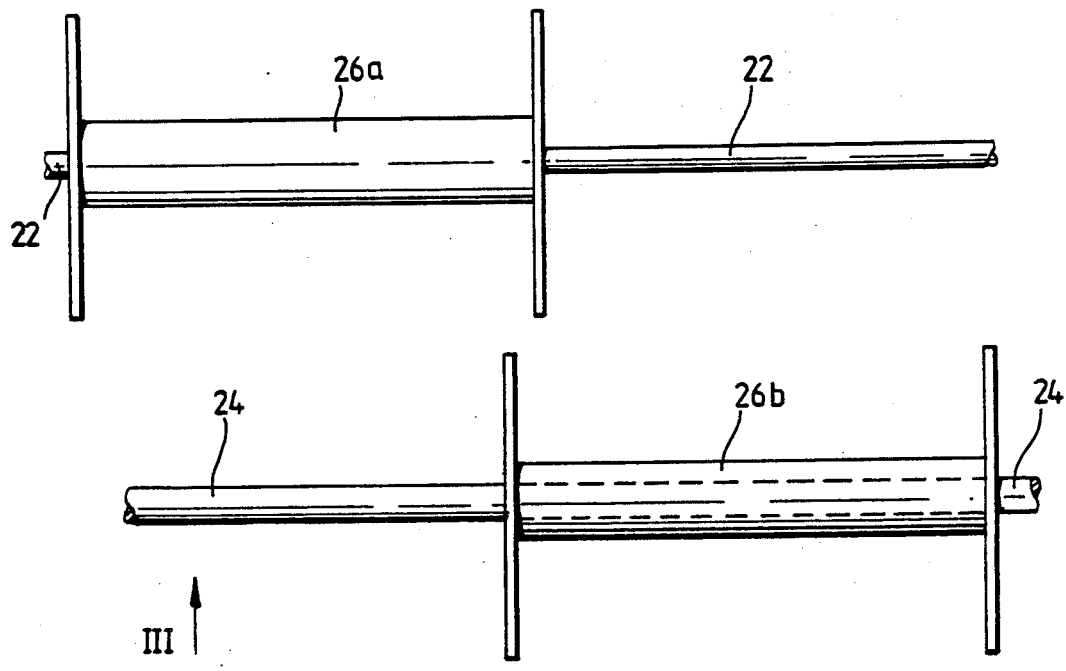
Figure 4:
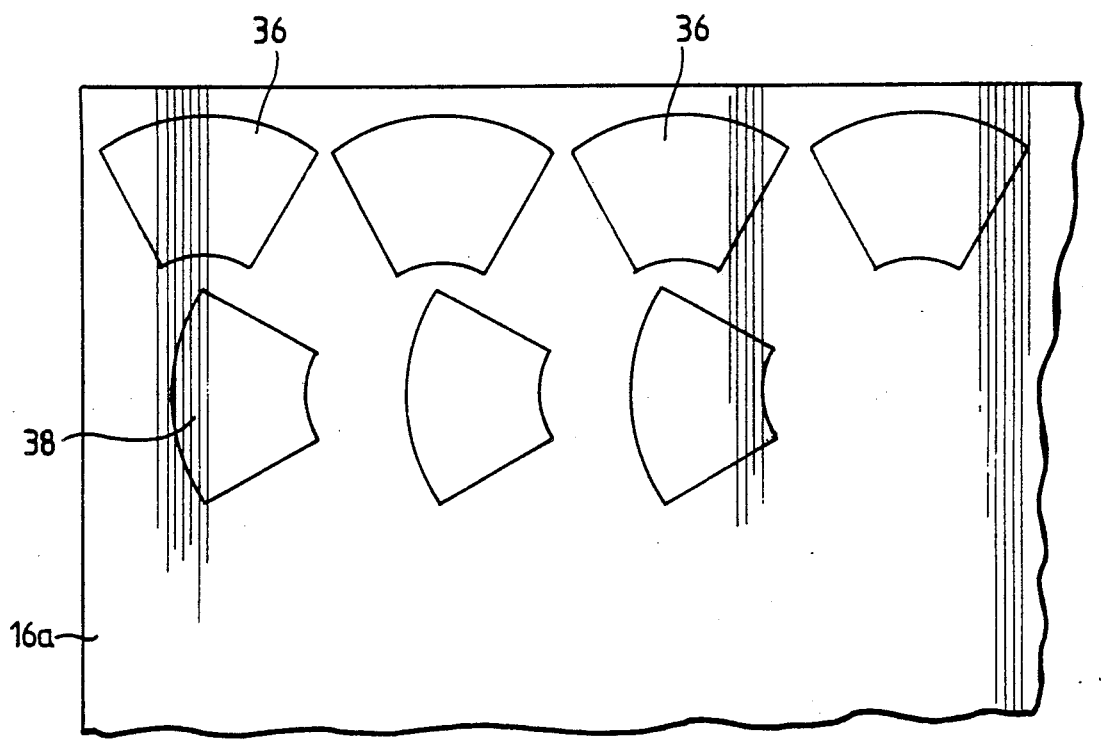
Figure 5:
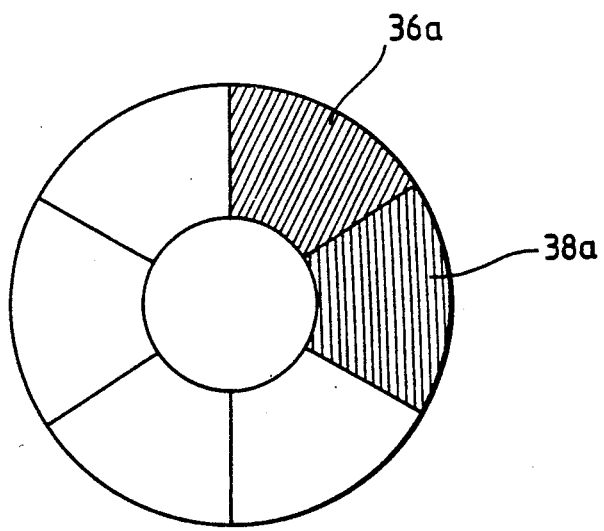
Figure 6:
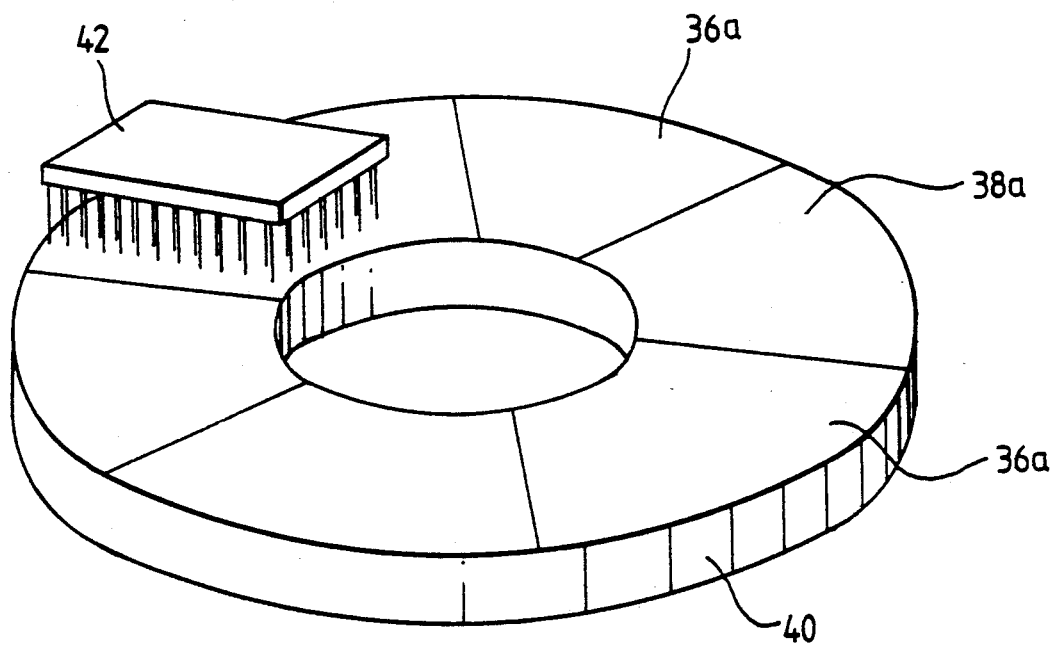
Figure 7:
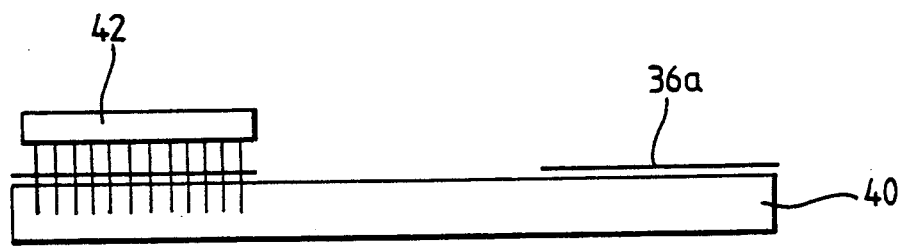
Figure 8:
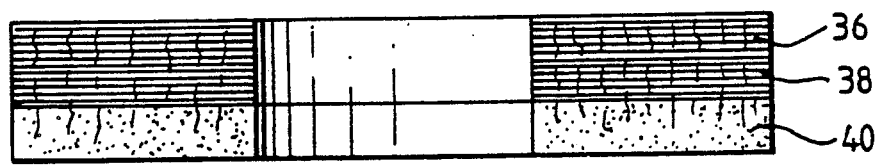
Figure 9B:
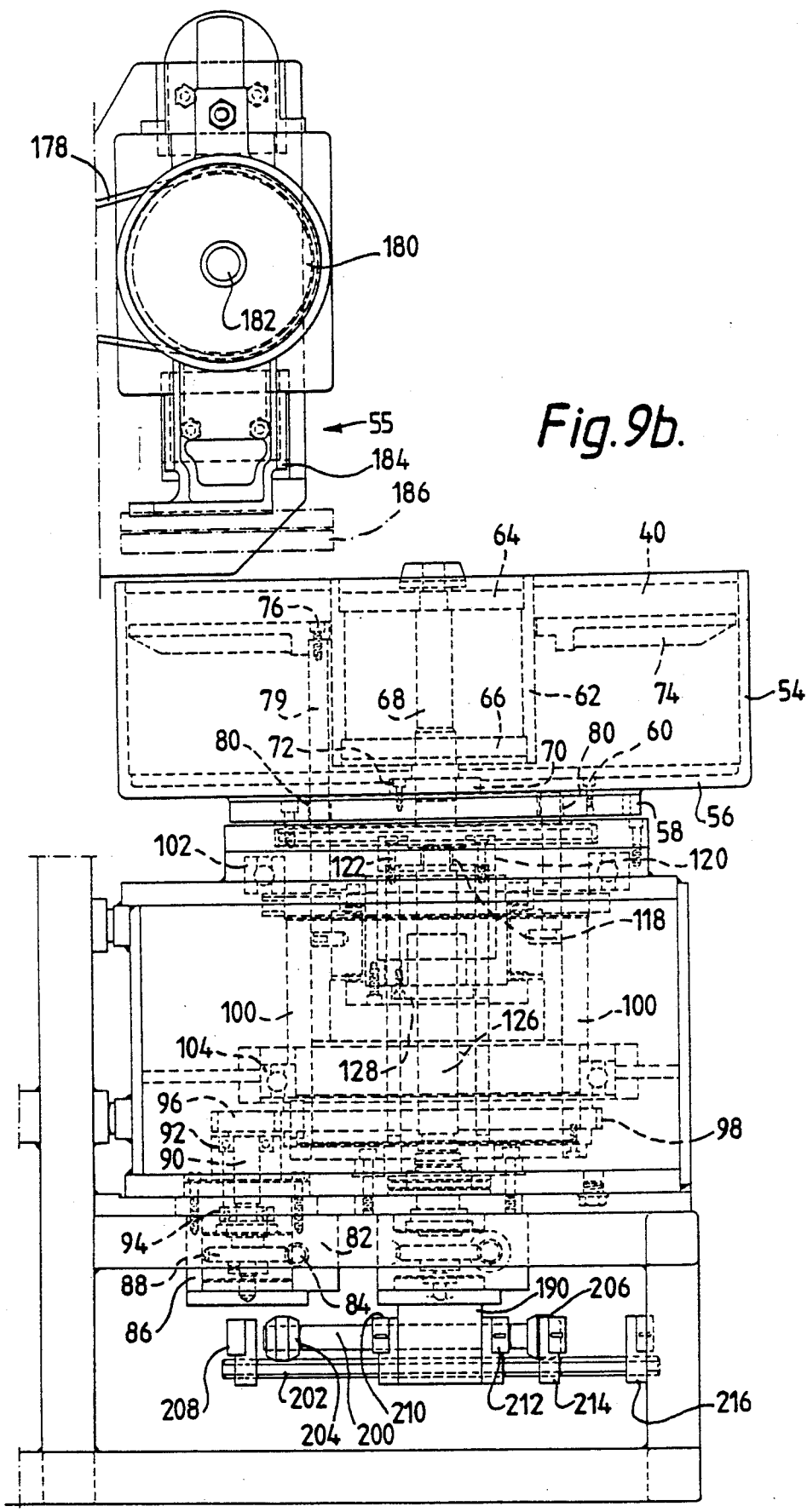

A method of manufacturing a carbonisable filamentary assembly for use as a preform, and apparatus for use in carrying out the manufacturing method will now be described by way of the various aspects of the invention. In the accompanying drawings:

FIG. 1 is a diagram illustrating a first needle punching stage of the method;

FIG. 2 is a plan view of part of apparatus for presenting a sheet of filamentary material to a needle loom, FIG. 3 is an elevation looking in the direction of the arrow III in FIG. 2, FIG. 4 is a plan view of a sheet of filamentary material showing the cutting of segments from the sheet, FIG. 5 is a plan view of an assembly of segments to form an annular layer of sheet material, FIG. 6 illustrates diagrammatically the method of needle punching an assembly of segments, FIG. 7 shows a first stage in an assembly needling operation, FIG. 8 is a cross-section through the assembly the end of the needling operation, FIGS. 9a and 9b are diagrams illustrating an annular needle punching machine, FIG. 10 is a detail view to a larger scale partly in section, showing a rotatable receptacle and associated parts used in the machine shown in FIG. 9, FIG. 11 i a detail view to the same scale as FIG. 10, of the driving mechanism for the apparatus shown in FIG. 9.

Figure 12:
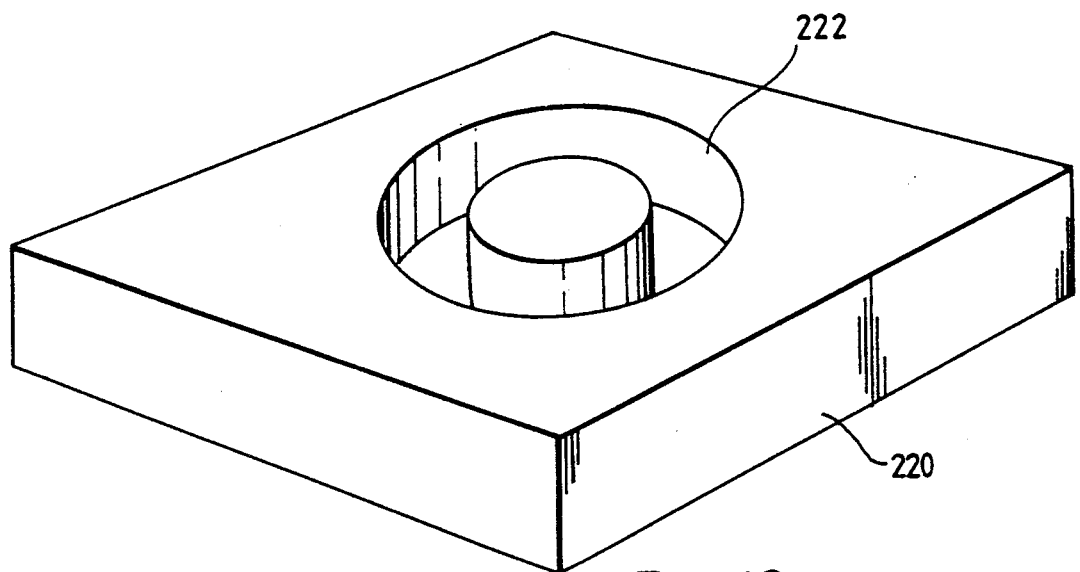
Figure 13:
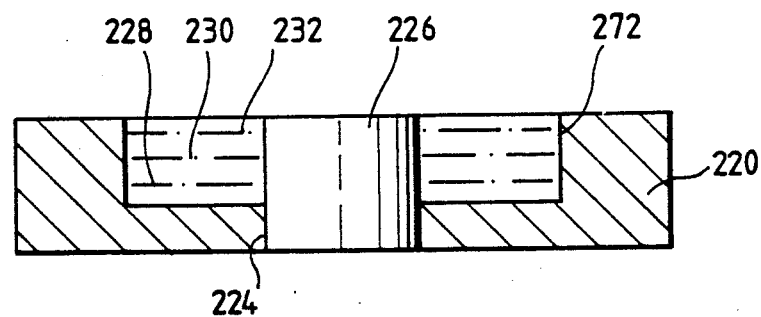

FIG. 12 is a perspective view of a receptacle used in an alternative manufacturing procedure, and FIG. 13 is a vertical section through the receptacle shown in FIG. 12.

The specific example relates to the manufacture of a "preform" made of oxydised polyacrylonitrile filaments. Such a preform may be carbonised, impregnated with a resin and then baked at very high temperature, so that both the fibrous filaments and the resin are changed to a carbonaceous form, whereby there is produced a shaped article made of carbon reinforced with carbon fibres—such a product is referred to as a carbon-carbon product. The technique of converting polyacrylonitrile fibres to carbon fibres by heat treatment is well known as are the techniques for production of carbon-carbon products and hence it is not necessary to describe these techniques in detail.

The polyacrylonitrile material is rendered suitable for carbonising by at least partial oxidation effected by passing the material through a furnace containing an oxidising atmosphere. It emerges from the oxidation process in the form of a continuous single filament textile fibre, that is to say, it is flexible and capable of being woven. However, the filamentary material has a highly polished surface sheen and is consequently quite difficult to handle.

For use in the process of the invention, the material is obtained in tow form and in a specific example, each tow is constituted by some 320,000 continuous filaments. It is necessary to assemble the filaments in the form of a uni-directional sheet (warp). The filament should be held taut and touching each other to produce total "cover" of the planar area of the sheet and in a typical example the thickness of the sheet of filaments is about 3 millimetres. One way of producing this initial layer or sheet of filaments is to wind a series of tows on to the drum of a conventional warping machine. However, it has been found that a better prepared sheet of filaments can be formed using a special preparation apparatus shown in FIGS. 1, 2 and 3.

Referring first to FIG. 1, the required number of tows 10, each carried by a short flanged drum 12, is mounted end-to-end on a single stationary beam 14. From this beam 14, the filaments are drawn in warp sheet form (indicated at 16) through a needle loom 18, and on to a take-up roller 20. Arrangements for letting off filaments in warp form; drawing them through processing equipment and winding them up on a take-up roller, are well known in the textile industry and therefore require no detailed description here. It should be mentioned however that the take-up roller 20 should have a driven spindle (flanged) to ensure that the necessary tension is applied to the filamentary sheet. The needle loom itself is only very diagrammatically illustrated in FIG. 1.

Instead of the flanged drums 12, the individual tows may be drawn directly from the cartons in which they are normally supplied.

Between the beam 10 and the needle loom 18, there are two parallel rods 22 and 24, which will be referred to as the spreader rods. Special flanged spreader devices 26 are mounted on the rods 22 and 24 and the arrangements of these devices is such that the tow from a single drum 12 or carton is received between the flanges of a single spreader device, and the spreader devices themselves alternate across the width of the apparatus on the spreader rods 22 and 24, i.e. a first spreader device 26a is on the rod 22, the next spreader device 26b is on the rod 24, the next on the rod 22 and so on.

Essentially, each spreader device 26 comprises a cylinder able to turn on the rod 22 or 24, the periphery of the cylinder being slightly bowed (banana-shaped)—this shaping of the cylinder is exaggerated in FIG. 3 for illustrative purposes. Locking means (not shown) are provided for locking each device 26 in a selected angular relationship to the rod on which it is mounted.

Considering the spreader device 26b this is illustrated with its maximum radius on the top side of the rod 22. It will be observed from FIG. 1, that the sheet of filaments 16 is stretched over and in engagement with the cylinders of the spreader devices 26. Now if a particular tow passes over a device 26 orientated on its rod 22 or 24 as at 26b, the effect will be to cause the filaments to spread laterally (because they tend to slide away from the high centre point towards the flanges of the device 26). The opposite extreme is illustrated at 26a where the smallest radius of the cylinder is at the top, and consequently, there is a tendency for the filaments to slide towards the centre and therefore to be compressed laterally. It will be appreciated that it is possible to adjust the preset orientation of the spreader devices at any angular disposition between the extremes shown at 26a and 26b (including the halfway position at which no lateral spreading or compressing force is applied to the filaments) to present a warp sheet issuing from the spreading arrangement which is as consistent as possible in terms of a lateral density of the filaments and the tension in the filaments.

The needle loom 18 is conventional is conventional in construction and operation. A set of barbed needles 28 is mounted in a vertically reciprocable needle board 30, and those needles are arranged in a plurality of rows each extending across the full effective width of the machine (i.e. the maximum overall width of the filamentary sheet 16). The needle loom has the conventional bed plate 32 and stripper plate 34 both of which are perforated to allow passage of the needles 28 when the needle head 30 descends, and the path of the sheet 16 is between these plates.

In operation, the needles 28 penetrate the filamentary sheet 16 on their descent and are then drawn out of it on their ascent. The barbs of the needles catch some of the filaments and pull those filaments downwardly, so that the caught filaments are severed (because they are held taut) and form generally vertical fibres which tend to bind the filaments of the sheet 16 together. As a result of this needling operation, the sheet 16a issuing from the needle loom and wound on to the take-up spindle 20, has changed from an arrangement of longitudinally extending filaments completely separate from each other into a "fabric" mainly comprising longitudinally extending filaments (and therefore having very good dimensional stability in the longitudinal direction) but with these longitudinally extending filaments sufficiently bound together by the displaced filaments to give the "fabric" some degree of stability in the lateral direction. It will be appreciated that the lateral stability is quite poor, but it is sufficient to allow the "fabric" to be manipulated for subsequent processing, so long as it is not subjected to severe lateral stress.

The next stage in the manufacturing process is illustrated in FIG. 4, and this is a cutting stage. The sheet 16a is placed on the bed of a cutting machine (not shown) equipped with shaped knives for cutting segments 36 and 38 out of the sheet. Such cutting machines are used in garment manufacture or in the manufacture of footwear. The result of the cutting process is to produce a multiplicity of segments of an annulus, six of which can be assembled as shown in FIG. 5, in a side-by-side arrangement, to produce a flat annular-shaped assembly or fabric layer.

The preform which is made by the exemplary method herein described is intended to be used as the basis of a carbon fibre reinforced disc for a brake particularly suitable for aircraft use, and this product requires the annular shape shown in FIG. 5. The annular shape in turn determines the shape of the segments 36 and 38—though it is to be understood that more or less than six such segments could be used and this would alter the dimensions and precise shape of the segments. It is a significant feature of the process that the segments are cut from the needled filament sheet 16a.

One advantage of the segmental structure method will be immediately apparent, in that it is possible to produce the required shape (in this case an annulus) with relatively little wastage of the filamentary sheet.

Since the oxydised polyacrylonitrile material is very expensive, this is a great advantage. The actual technique of laying out the segments on the sheet is well understood in the garment and footwear industries. However, there is another advantage to the segmental construction method, which is well illustrated in FIG. 4, in that the segments 36 are cut in such a way that the majority of the filaments extend substantially radially of the eventual annulus (see segment 36a in FIG. 5), whereas the segments 38 are cut so that the majority of the filaments extend substantially chordally of the annulus (see segment 38a in FIG. 5). Clearly the segments 36 will have their greatest dimensional stability in the radial direction, and the segments 38 will have their greatest dimensional stability in the chordal direction.

The segments are assembled into the annular shape on a support 40 (see FIGS. 6, 7 and 8) which is made of foamed polyethylene, formed to the same annular shape as that required of the finished preform. The method of assembling the segments on the support 40 will be hereinafter described, but for present purposes it will suffice to say that the segments are laid in the side-by-side arrangement shown in FIG. 5 on the support. The first layer of segments thus laid up on the support may comprise a set of segments 36 with the filaments of all the segments radially disposed, or it may comprise a set of segments 38 with the filaments of all the segments chordally disposed, or it may comprise segments 36 alternating with segments 38.

At that stage, with a single layer of segments on the support 40, a needle punching operation, using barbed needles as in the needle loom, is carried out on the support and the first layer of segments. The needles displace some of the filaments into a generally vertical disposition, and this has two effects:

(i) it further stabilises the segments themselves; and
(ii) it binds a needled assembly of segments on to the support 40, because, as shown in FIGS. 7 and 8, some of the filaments are displaced into the foamed support.

It may be found advantageous to lay two layers of segments, one on top of the other, before this first needle punching operation. In that case, it is preferred to arrange segments with one orientation of filaments on top of segments having the alternative filament orientation; but it is also preferred to lay up the second layer so that its radial joints do not coincide with the radial joints of the first layer.

The use of a foamed needle-penetrable support in a needle punching operation is an important feature of the process, because it ensures the stability of the assembly of segments in the required structural shape at a stage in the manufacturing process, when the segments are both relatively fragile and very difficult to manipulate.

A second layer of segments similar to the first layer is then laid on top of the first layer of segments, and needle punching operation is repeated, using a small, vertically reciprocable needling head 42 illustrated in FIG. 6. This has the effect of cross-linking the two layers of segments by vertically disposed filaments; further consolidating the first layer of segments; increasing the thickness of the total assembly of segments and further securing the assembly to the support 40. It will be appreciated that the segments of each layer may themselves be formed of two layers of individually cut segments.

Now the segments of the second layer are selected and arranged so that the filaments in the second are differently orientated than those in the first layer—e.g. a segment with chordally arranged filaments is disposed over a segment with radially arranged filaments. However, it is also preferred to arrange that the radial joints of the second layer do not coincide with the radial joints of the first layer. This process of adding layers of segments and needling them continues until the required overall thickness of the preform is arrived at as shown in FIG. 8.

The depth of stroke of the needles is kept constant during the addition of the layers of segments, but as each layer is added, the stroke of the needles is displaced upwardly approximately the thickness of a layer of segments. In other words, there is superimposed on the vertical reciprocation of the needle head 42 a slow upward translatory motion, so that the extent of the needle stroke is always rising. The result is that all the eventual mass of filamentary material is cross-linked by vertically displaced filaments, but towards the upper end of the range, the needles are not penetrating the support 40. Therefore only the lower layers of segments are themselves cross-linked to the support and the top and bottom layers are not directly cross-linked, although the whole mass is well bound together.

It has been found that if the included angle of each of the segments is 68° it is possible to arrange a multiple layer of segments one on another without any two radial joints being aligned with each other. It will be appreciated that if the segments subtend 68°, then instead of forming a complete first layer and then laying a second layer on top of it, as has been described above for simplicity, what actually happens is that a larger number of segments together form a helix which is continuously laid up on the support 40, with one convolution lying on the next and the needling operation is carried out in a continuous fashion by turning the support 40 about the vertical axis of the annular shape to bring all parts of the assembly under the needling head 42.

When the structure of filamentary material on the support 40 is of adequate thickness and has been sufficiently needle punched, the whole assembly of the support and the preform can be stored and/or transported. It will be appreciated that if the filamentary structure is of relatively low density and/or quite thin, it may be still quite limp, and somewhat difficult to manipulate by itself, but the polyethylene support 40 gives it a good degree of rigidity. However, in many instances, the preform will itself have adequate rigidity to allow it to be manipulated without the polyethylene support.

The filamentary preform is peeled off the support 40 prior to carbonisation. It has been found that the filaments inserted into the support are not too firmly embedded therein to prevent their withdrawal and providing the needling into the support is properly controlled, it is quite possible to peel the preform from the support. This was a surprising discovery, which enabled the use of the foamed but relatively rigid support.

The oxydised preform is then placed in a carbonising oven and at this stage it is possible to use a lightweight mould only to achieve a controlled fibre volume fraction. This is because the needle punching has given the preform adequate stability, compacted it and introduced cross-binding filaments.

The preform is sufficiently rigid to allow it to be placed in a furnace entirely without moulds for the formation of the matrix. After matrix formation in the furnace, the resulting carbon-carbon product (now quite rigid) can then be machined if necessary and provides a disc for use in high duty brakes for vehicles. In fact, it is suitable for use on aircraft undercarriages. It has been found that a disc made by the method of the invention is particularly well adapted to resist applied stresses as applied in braking without delamination or other structural failure. In addition, it will be appreciated that the method is cheaper than prior art methods, because of the saving of material and: energy Turning now to FIGS. 9a, 9b, 10 and 11, there is shown a machine which is adapted to carry out the segment assembly and needle punching technique described in general terms previously, with reference to FIGS. 6, 7 and 8.

It has also been found possible to vary the density of the needled assembly by increasing or decreasing the needling action—an increase in needling increasing the bulk density of the product. Because the product is inherently less liable to delamination than similar products made by the known methods, relatively low densities may be used, with consequent saving in material.

The machine has a stationary plinth 50, to which there is rigidly attached a stationary drive housing 52. An open topped rotary receptacle 54 in which the segment assembly and needle punching takes place is mounted for rotation about its own vertical axis on top of the drive housing 52. The machine also has a needle punching head 56 slidably mounted upon the plinth 50.

The open topped receptacle 54 is cylindrical and has a closed bottom 56; it is secured on a circular drive plate 58 by screws 60. The drive plate 58 forms part of the driving mechanism of the machine to be hereinafter described, but the receptacle 54 can be removed by unfastening the screws 60, and replaced by an alternative receptacle. A cylindrical core 62 has end plates 64 and 66, and is secured on a core spindle 68 so as to be rigid with that spindle. At its lower end the core spindle 68 has a flange 70 which can be secured by screws 72 to the drive plate 58. By unfastening these screws 72, it is also possible to remove the core 62 from the drive plate 58. It will be appreciated, that since both the receptacle 54 and the core 62 are secured to the drive plate 58, they rotate together with that plate. In use, the core 62 defines the internal diameter of an annular segment assembly, and the peripheral wall of the receptacle 54 defines the outside of the segment assembly.

Mounted within the annular space in the receptacle 54 is an annular false bottom 74. A false bottom lowering member 78 has a cylindrical lower section 77 from which three equi-angularly spaced driving columns 79 project upwardly. The false bottom 74 is secured by screws 76 to the top ends of the driving columns 79. Each of the columns 79 extends through a bearing arrangement 80 in the drive plate 58, so that when the drive plate 58 is rotated, the driving columns 79 rotate with it, and consequently, the false bottom 74 is also rotated with the receptacle 54 and the core 62. Hence, there is provided a rotary receptacle arrangement to contain the assembly of segments as that assembly is being built up and needle punched.

The false bottom is capable of vertical motion with the lowering member 78 (as will be hereinafter described) from a top position illustrated in full lines in FIG. 10, to a lowered position illustrated in chain-dotted lines in FIG. 10. The particular receptacle illustrated in FIGS. 9b, 10 and 11, can only be used to produce an annular assembly of specific dimensions. In practice, the machine illustrated can be used to manufacture annular assemblies having a range of dimensions, because it is possible to completely remove the receptacle core and false bottom, and replace these by an alternative receptacle arrangement having different dimensions appropriate to another size of finished needled product.

For the purpose of driving the drive plate 58 (and therefore rotating the receptacle 54), a small variable speed receptacle drive motor 82 is secured to a stationary element within the drive housing 52. The motor shaft is connected directly to a worm shaft 84 in a receptacle drive gearbox 86. The worm shaft 84 meshes with a worm wheel 88 mounted on a primary shaft 90 which is journalled in bearings 92 and 94 carried by stationary parts of the drive housing 52. A driving pinion 96 is keyed on the primary shaft 90, and meshes with a large spur gear 98 keyed on the outside of a main drive spindle 100 which, as is clear from FIG. 11, essentially comprises a cylinder. The main drive spindle 100 is itself journalled in bearings 102 and 104 which are located in stationary elements of the drive housing 52. It will be appreciated therefore, that when the motor 82 is operated, drive is transmitted through the worm gear reduction box and the primary shaft 90, to the spindle 100, which rotates at a relatively low speed. The drive to the spindle 100 is controlled through an electrical control system (not shown) which is set to ensure that the assembly of segments accumulating in the receptacle 54 is rotated at a speed required to produce adequate needle punching of the segments, as those segments pass underneath the needling head 55.

It has already been mentioned that the false bottom 74 is rotated with the receptacle 54, by virtue of the drive transmitted through the bearing arrangements 80 to the driving columns 79. However, the driving arrangement also incorporates a mechanism for raising and lowering the false bottom 74 in accordance with the requirements of the needle punching and assembling operation. To this end, a small variable speed elevation motor 106 is provided within the lower part of the drive housing 52, and the motor shaft is directly connected to a worm shaft 108 of an elevation gearbox 110 secured to stationary parts of the drive housing 52. The worm shaft 108 meshes with a worm wheel 112 keyed onto a screw shaft 114 which is coaxial with the vertical axis about which the receptacle 54 rotates. At its lower end, the screw shaft 114 is journalled in bearings 116 in a stationary part of the drive housing 52. The upper end of the screw shaft 114 is journalled at 118 in a cap 120 which is secured by screws 122 to the top ends of three stationary pillars 124 the bottom ends of which are welded to a stationary part of the drive housing 52. Consequently, the pillars 124 provide mountings for the top cap 120 the purpose of which is to provide a top journal mounting for the screw shaft 114.

The main portion 126 of the screw shaft 114 is screw threaded, and an elevation nut 128 engages with this screw threaded main portion 126. The nut 128 is secured by screws 130 in a slider 132. The slider 132 is generally cylindrical, with an inturned flange at its lower end, and the pillars 124 extend through bearings 134 in this inturned bottom end. It will be recalled that the pillars 124 are fixed at their lower ends to a stationary part of the drive housing 52, and hence do not rotate. The bearing arrangement 134 prevents rotation of the slider 132, which in turn prevents rotation of the nut 128. However, the bearing arrangement 134 permits the slider 132 to slide vertically on the pillars 124. Hence, as the screwed shaft 114 is rotated, the nut 128, being prevented from rotating, moves logitudinally of the screwed shaft (i.e. it moves vertically). The slider 132 is provided with top and bottom bearing flanges 136 and 138, and an annular drive member 140 is located between these flanges 136 and 138. The cylindrical lower section 77 of the lowering member 78 is secured by pins 142 to the annular drive member 140. By virtue of this connection, the annular drive member 140 has to rotate with the lowering member 78 and therefore with the receptacle 54, but bearings between the annular drive member 140 on the one hand and the slide member 132 with its flanges 136 and 138 on the other hand ensure that the member 140 is able to rotate despite the fact that the slider 132 is non-rotatable. The end flanges 136 and 138 are the means whereby the axial motion of the nut 128 is transmitted to the lowering member 78. It will be appreciated that this axial motion of the member 78 with its columns 79 produces the elevation and lowering of the false bottom 74 within the rotary receptacle 54.

The mounting for the needling head 55 comprises a long slide 150 having dovetail cross section slide bearings (similar to those used on machine tools) engaging in a stationary mounting 152 on the plinth 50. Thus, the slide 150 is able to move in a longitudinal direction indicated by the arrow A, that is radially with respect to the rotational axis of the open topped receptacle 54. A traversing screw 154 is journalled in an extension of the mounting 152, and is controllable through a handwheel 156. The split nut 158 is secured by screws 160 to the slide 152, and this nut engages on the screw 154. Rotation of the handwheel 156 therefore causes sliding motion of the slide 150 in or out with respect to the vertical axis of the receptacle 54 according to the direction of rotation of the handwheel. (As an alternative to the handwheel 156, or in addition thereto, there may be power driven means for rotating the spindle 154 to produce the radial motion of the slide 150.)

The slide 150 carries a stop rod 162 on which are adjustably mounted stops 164 and 166 adapted to cooperate respectively with limit switches 168 and 170 to indicate the inner and outer extremities of motion. As illustrated in FIG. 9a, the slide 150 is shown at the inner end of a preselected movement, with the stop 164 engaging with the limit switch 168. A signal initiated by the limit switch 168 will indicate to the setter, that the needling head 55 has been correctly located with respect to the receptacle 54. It will be appreciated, that when an alternative receptacle 54 is fitted to the drive plate 58, it is necessary to adjust the position of the stops 164 and 166 accordingly.

The needling head 55 has a variable speed driving motor 172, on the motor shaft extension of which is a driving pulley 176 of a toothed belt drive 178. The driven wheel 180 of the belt drive is keyed onto the driving shaft 182 of the needling head 55.

It is unncessary to describe the mechanism of the needling head 55 in detail, because essentially, this mechanism is the same as that of a dabber brush as used on a Noble comb in the combing industry. Suffice it to say for present purposes, that there is a vertically reciprocable needle carrier 184 which is operated by the drive from the motor 172. Various sizes of needle board 186 can be fitted to the lower end of the needle carrier 184, each of these needle boards being similar to the needle boards used on a conventional needle loom, excepting that they are much smaller in area than those used on a needle loom. For any particular application, the needle board 186 has to be able to fit in the annular space between the core 62 and the wall of the receptacle 54 in carry out the needling operation. Each needle board 186 is provided with the usual barbed needles (not shown) as used in a needle loom for penetrating a fibrous mass. The electrical control system is so arranged that the needle board 186 always comes to rest in the raised position where the needles are clear of the top of the receptacle 54.

It will be appreciated, that with the needling head 55 in the innermost position as indicated in FIG. 9, it is possible to carry out a needle punching operation on filamentary segments or assemblies of such segments located on the false bottom 74 within the receptacle 54. Moreover, as the receptacle 54 is rotated under the stationary needling head 55, the complete annular assembly is subjected to the needling action. One of the important features of the present invention is the carrying out of a needle punching operation on filamentary material, where the material traverses a recirculating path (namely the rotation about the vertical axis of the receptacle 54) under a stationary needling head. This is in contradistinction to the ordinary needle loom arrangement, such as that shown diagrammatically in FIG. 1, where a continuous length of filamentary material moves in rectilinear fashion under a needling head.

It will be noted that there is no stripper board as used in conventional needling looms, although if it is found necessary to use such a stripper board, it can be mounted from the stationary parts of the needling head 55.

Provision is also made in the machine for automatic control of the elevation and lowering of the false bottom 74 within the receptacle 54. For this purpose, a speed reduction gearbox 190 is attached to the underside of the worm gearbox 110, and a train of speed reduction gears 192 transmits driving motion from a driving pinion 194 mounted on the bottom end of the screw shaft 114 to a pinion 196 meshing with a rack 198 attached to a control rod 200; this control rod 200 is mounted for axial sliding motion and is driven through the gearbox 190 whenever the screw shaft 114 is rotated. The gearing is so arranged that the stop rod moves to the right as seen in FIG. 11 when the false bottom 74 is being lowered. Closely adjacent to the stop rod 200 is a switch mounting rod 202 which is fixed to the casing of the gearbox 190. Consequently, the switch mounting rod 202 has no motion, and therefore there is relative motion between the stop rod 200 and the switch mounting rod 202.

A pair of dogs 204 and 206 is attached to the of the stop rod 200, and these dogs are adapted to cooperate with a series of switches 208, 210, 212, 214 and 216 adjustably mounted on the switch mounting rod 202. The switch 210 is adapted to be tripped by the dog 204 whenever the screw 114 has been rotated to bring the false bottom 74 into the lowest operative position and is referred to as the "DOWN" switch. The switch 216 is adapted to be tripped by the dog 206, should the switch 210 fail to operate to protect the machine parts. Closure of the switch 210 which is referred to as the "DOWN" switch should terminate the electrical supply to the elevating motor 108 to prevent further downward motion of the false bottom 74, but if for some reason the false bottom continues to descend, closure of the switch 216 by the dog 206 will cut off the electrical supply. The switch 216 is therefore referred to as the "OVERRUN DOWN" switch.

The switch 212 is adapted to be operated by the dog 206 when the false bottom is elevated above the starting position, to a discharge position where it projects above the to of the receptacle 54. The switch 212 is referred to as the "UP" switch.

The switch 214 is adapted to be tripped by the dog 206, when the false bottom is in the starting position illustrated in FIG. 10 and therefore this switch is referred to as the "START" switch. When this switch is tripped, it is adapted to cause the operation of the driving motor 82 for rotating the receptacle 54, and also for operating the elevation motor 106 for commencing the lowering of the false bottom 74.

Finally, the switch 208 (which is referred to as the "UP OVERRUN" switch) is adapted to be tripped by the dog 204 if the false bottom should be elevated to a position above the normal up or discharge position.

When the machine illustrated in FIGS. 9, 10 and 11 is to be operated, the correct size of receptacle 54 is bolted to the drive plate 58, and the appropriate size of needle board 186 is fitted to the needling head 55. As has already been mentioned, the machine is equipped with electrical control circuitry which receives signals from the switches 168 and 170 operated by the in and out feed of the needling head 55, and from the switches 208, 210, 212, 214 and 216. The control circuit is set to bring about a sequence of operation as follows: In the starting position, the false bottom 74 is located (as shown in FIG. 10) about ten millimetres below the top lip of the receptacle 54. This location is suitable for receiving the polyethylene support 40, and the support is placed on the false bottom, where it is located by the wall of the receptacle 54.

The slide 150 is then actuated by turning the handle 156, to move the needling head 55 into the operative in position, as illustrated in FIG. 9. When the needling head arrives at the in position, the switch 168 is closed, and this permits electrical power to be supplied to the two variable speed motors 82 and 106 of the machine. The first layer of segments 36 and 38 is then laid manually on the support 40, with their edges in abutting arrangement as illustrated in FIGS. 5 and 6. (As has been mentioned, this first layer may in practice be constituted by two layers laid one on top of the other.) When this first layer of segments has been laid on the support 40 in the receptacle 54, the driving motor 82 is operated, and the receptacle 54 begins to rotate. At the same time, the motor 172 driving the needling head 55 is operated, and consequently, the needling head begins to carry out a needle punching operation on the filamentary segments located beneath it in the receptacle 54. The needles carried by the needle board 186 penetrate the portion of the first layer of segments which lies under the needling head, carrying those fibres which are caught by the barbs of the needles vertically downwards from the plane of the segments 36 and 38 into the needle penetrable support 40. Although the needles themselves withdraw from the support 40, and from the filamentary segments 36 and 38, the filaments which have been displaced into this vertical position remain embedded in the support 40.

As the receptacle 54 rotates, it carries the first layer of segments under the needling position, and after a single rotation, all the first layer has been subjected to a needle punching operation, and it is secured to the support 40 by those filaments which have become embedded in the support.

At the end of a single rotation of the receptacle 54, a limit switch (not shown) is tripped and this causes actuation of the elevation motor 106 for a predetermined period of time. As a result, the elevating mechanism is operated to lower the false botom 74, through a distance which is approximately equal to the thickness of a single layer of the needled filamentary segments.

Further segments are then fed one at a time onto the first layer of segments as the receptacle 54 continues to rotate. Since the rotation will be relatively slow, it is possible to carry out this feeding of the segments by hand. The feed position may be located immediately in advance of the position at which the needling head 55 operates. As these further segments pass, under the needling head 55, they too are needle punched, and this has the effect of cross linking the segments to the segments of the first layer, and of course, further binding the assembly of segments to the needle penetrable support 40.

It will be appreciated that as each succeeding layer of segments passes under the needling head 55, it becomes cross linked by the vertically displaced filaments to the layers underneath it, and since the support 40 is descending in stepwise fashion, once every revolution of the receptacle, the penetration of the needles into the support 40 is progressively reduced. Eventually when the thickness of the assembly of segments on the false bottom exceeds the depth of penetration of the needles into the assembly of segments, there is no further cross linking of the filaments into the support 40.

The operation continues until a sufficient thickness of filamentary material has been built up into an annular structure supported by and bonded to the support 40. At that stage, the dog 204 will actuate the DOWN switch 210 terminating the supply of current to the driving motors 82, 106 and 172. Consequently, all the operations of the machine are brought to a halt. In practice, after all the segments have been fed into the receptacle 54, needling is continued until the entire preform constituted by the needled assembly of filamentary segments is clear of the needles, thus ensuring uniform density throughout the thickness of the filamentary preform.

Before the preform can be removed from the receptacle 54, the hand wheel 156 has to be turned to retract the needling head 55 from the operative position, to a retracted position. When the switch 170 is operated by the arrival of the needling head at the retracted position, the elevation motor 106 is then operated in the direction opposite to that which caused lowering of the false bottom 74, but at a higher speed, to produce rapid upward motion of the false bottom. This motion continues until the dog 206 operates the UP switch 212, at which point the power supply to the elevation motor 106 is terminated and the false bottom is arrested in the UP position, where it projects above the lip of the receptacle 54. It is then possible to lift the preform together with the needle penetrable support 40 as a unit off the thus elevated false bottom 74. As has been previously mentioned, the support 40 is useful in subsequent manipulation of the assembly, but it is possible to peel the needled assembly off the support 40 when required.

To restart the machine, the operative presses a control button (not shown) which operates the elevation motor 106, to lower the false bottom 74 into the START position. This completes the full cycle of operations of the machine.

It will be appreciated that the needle punching operation carried out in the machine illustrated in FIGS. 9a, 9b, 10 and 11 results in a degree of compacting of the filamentary segments such as is normally obtained by a needle punching operation. This is useful in the provision of a well bonded together filamentary product, and indeed the degree of needle punching can be such, that the original laminar construction of the product is virtually broken down due to the intense cross linking by vertically displaced filaments. This is useful not only in the provision of a preform which can be placed in a matrix forming furnace without the necessity for clamping, because it also helps to ensure that there is no delamination of the eventual disc, under applied stress. Moreover, it will be appreciated that by suitable control of the machine, it is possible to vary the fibre density, of the preform, by adjusting the speed of rotation of the receptacle 54 relatively to the speed of operation of the needle punching head and/or by adjusting the rate of descent of the support 74.

It should also be mentioned, that experiments have shown that a preform made in accordance with the invention, will have much greater strength than preforms made by known techniques. Consequently, it is possible to effect large savings in material costs, because the density of the preform can be substantially reduced compared with the preforms made by the known techniques. For example, it has been found that a preform formed in accordance with the invention and having a fibre volume of 15% is stronger than the present commercially available preform, which had a fibre volume of approximately 35%. It is expected therefore to be able to obtain satisfactory results, with a fibre volume of between 15% and 24%.

It is possible to manufacture filamentary preforms in accordance with the basic method of the invention, without using the special machine described with reference to FIGS. 9 to 11. The sheet material is made from oxidised polyacrylonitrile filaments, substantially as described above, with reference to FIGS. 1-3, and it is cut into segments for assembling into an annular form, as illustrated in FIGS. 4 and 5. However, the assembly of the filamentary segments, and the subsequent needle punching, to secure the needle segments to each other, and to the support, is carried out using the apparatus illustrated in FIGS. 12 and 13.

The receptacle 54 is replaced by a mould or jig 220 which is formed in polyurethane foam. A circular recess 222 is formed in the mould 220, the dimensions of this recess, being such that it is able to accomodate the assembly of filamentary segments. In other words, the inside diameter of the recess 222 is the same as that of a receptacle 54 for any particular size of preform, and the depth of the recess is such that the preform and a needle penetrable polyethylene support similar to the support 40 previously described, can be accomodated within the recess.

A hole 224 is formed in the base of the mould 220 below the recess 222 and the lower end of a cylindrical polyurethane core 226 is pressed into the hole 224. As illustrated in FIGS. 12 and 13, the core 226 is of approximately the same depth as the mould 220, so that when in position, its top surface is level with the top surface of the mould around the recess 222. The core 226 provides the inner location for the segments when they are assembled, and it therefore performs the same function as the cylindrical core 62 in the machine illustrated in FIG. 9b. It is to be understood, that the core size can be altered by fitting different sizes of core into the hole 224. Although the arrangement illustrated in the FIG. 13 is the most likely one, in which the core is parallel sided, there could be a step in the diameter of the core, so that the part in the recess is either of smaller or larger diameter than the part which forms the spigot fitting in the hole 224.

A series of three supports 228, 230 and 232 each of which is similar to the polyethylene support 40 previously described is provided. However, it will be noted from FIG. 13, that when these three supports are assembled in a stack one on top of the other, they are still located within the recess 222, and do not project above it. In other words, the supports 228, 230 and 232 are somewhat thinner than the single support 40 used with the machine illustrated in FIGS. 9-11.

In use, the three supports 228, 230 and 232 are assembled in the stack as illustrated in FIG. 13, and the first layer of segments is laid on top of this stack, within the recess 222 and surrounding the core 226. The entire mould or jig 220 containing the supports and the first layer of segments is then simply passed through an ordinary needle punching machine, for example the machine illustrated at 18 in FIG. 1. As a result, a needle punching operation is carried out on the mould itself, and also on the segments located within the mould. Obviously, those needles which penetrate the mould outside the recess 222 have no effect, since there is no filamentary material at that position. However, the needles which penetrate the filamentary segments within the recess 222 carry out a needle punching operation which has the effect of consolidating the first layer of filamentary segments, and binding that layer to the supports 228, 230 and 232.

Further layers of segments are then added, and after each layer (or sometimes after two layers) have been added, the entire apparatus is again passed through the needle loom 18. When the needle punched material in the mould builds up to height such that it is level with the top of the mould, the assembly is removed from the mould, the bottom support 228 is peeled off, and then the assembly comprising the supports 230 and 232 with the needled segments attached to them, is replaced in the mould. Obviously, the top surface of the needled material is then at a lowered position in the recess 222, and it is possible to continue adding further segments, and passing the entire mould with the assembly in it through the needle loom 18. In due course, the assembly is again removed from the mould, the support 230 is peeled off, and then the support 232 with the needled assembly attached to it is replaced in the mould to allow the adding of further layers of segments and further needling in the conventional needle loom.

It will be appreciated that this alternative method of building up the needle punched assembly is somewhat slower and more cumbersome than that employing the machine illustrated in FIGS. 9 to 11, but it does enable the entire process to be carried out using only a conventional needle loom.

It should be understood, that the invention is not restricted to the manufacture of annular shaped preforms. Thus for instance, if the preform is of square shape, a mould similar to the mould 220 could be provided, having an appropriately sized square recess, and the core 226 would be omitted. Needle penetrable supports similar to the supports 228, 230 and 232 would be provided, excepting that each of these would be of square shape. Obviously the segments cut from the initial sheet of needle punched filamentary material would have to be of a shape such that they could be built up when laid side-by-side into the square shape of the finished preform. Otherwise, the manufacturing process could be carried out exactly as described above with reference to FIGS. 12 and 13 of the drawings.

Further, the machine shown in FIGS. 9 to 11 could be used to produce non-annular preforms, for instance by inserting in the receptacle 54, polyurethane or polyethylene formers (with outer walls conforming to the inside of the wall of the receptacle 54) the inside shapes of the formers building up into the required external shape of the preform. Indeed a single former having a circular outside to fit the wall of the receptacle could be used, the required preform shape being cut out of the single former.

We claim:

1. A method of assembling a multiplicity of filaments to form a filamentary sheet in which the filaments are drawn under tension applied to all the filaments, comprising the steps of:
   (a) orienting a banana-shaped spreader having a convex and a concave surface to present either the convex or concave surface of the spreader in filament-receiving relation to the multiplicity of filaments;
   (b) stretching the filaments over and in engagement with the convex or concave side that is in filament-receiving relation to the filaments to thereby;
   (c) spread the filaments across the convex side of the spreader; or
   (d) compress the filaments across the concave side of the spreader dependent on the orientation of the convex or concave surface of the spreader relatively to the path of the filaments engaging with it.

2. A method of assembling a plurality of tows according to claim 1, and including the steps of:
   (a) providing a plurality of adjacent banana-shaped spreaders, each having a convex and a concave surface to present either the convex or concave surface of the respective spreaders in filament-receiving relation to the multiplicity of filaments; and
   (b) offsetting said adjacent spreaders from each other in the direction of travel of the filaments to permit lateral overlap of said adjacent spreaders.

3. Apparatus for assembling a multiplicity of filaments to form a filamentary sheet comprising a filament package; a take-up arrangement for drawing the filaments from the package under tension and a banana-shaped spreader arranged between the package and the take-up arrangement and having a filament-engaging surface for deflecting the filaments.

4. Apparatus according to claim 3, wherein the banana-shaped spreader is mounted for turning about a longitudinal axis so that it can be adjusted to bring different parts of its surface into engagement with the filaments.

5. Apparatus for assembling a plurality of tows each comprising a multiplicity of filaments to form a filamentary sheet, comprising:
   (a) a plurality of tow packages;
   (b) a take-up arrangement for taking up all the filaments in a sheet and drawing the tows under tension from their respective packages;
   (c) a plurality of banana-shaped spreaders each having a convex and concave filament-engaging surface, one of said spreaders being provided for each tow;
   (d) the spreaders being arranged so that the surface of each spreader will engage with the deflect the filaments of its respective tow, so as to constrain the filaments to spread or compress laterally depending on the orientation of the surface of the spreader relatively tot he path of the filaments engaging with it; and
   (e) adjacent spreaders being off-set from each other in the direction of travel of the filaments to permit lateral overlap of adjacent spreaders.

* * * * *